United States Patent
Porter

(10) Patent No.: US 6,748,592 B1
(45) Date of Patent: Jun. 8, 2004

(54) METHOD AND APPARATUS FOR PROTECTIVELY OPERATING A DATA/INFORMATION PROCESSING DEVICE

(75) Inventor: Swain W. Porter, Kirkland, WA (US)

(73) Assignee: Xoucin, Inc., Kirkland, WA (US)

( * ) Notice: Subject to any disclaimer, the term of this patent is extended or adjusted under 35 U.S.C. 154(b) by 0 days.

(21) Appl. No.: 09/503,878

(22) Filed: Feb. 14, 2000

(51) Int. Cl.⁷ .................................................. G06F 9/00
(52) U.S. Cl. ........................ 718/100; 718/102; 718/104; 718/107; 710/240; 710/243; 711/100; 711/163
(58) Field of Search ................................ 709/103, 104; 717/139; 718/100, 102, 104, 107; 710/240, 243; 711/100, 163

(56) References Cited

U.S. PATENT DOCUMENTS

| | | | |
|---|---|---|---|
| 4,177,510 A | | 12/1979 | Appell et al. |
| 4,926,322 A | * | 5/1990 | Stimac et al. ................. 703/23 |
| 5,163,096 A | * | 11/1992 | Clark et al. .................. 711/164 |
| 5,446,903 A | * | 8/1995 | Abraham et al. ............. 710/240 |
| 5,469,556 A | * | 11/1995 | Clifton ........................ 711/163 |
| 5,553,239 A | | 9/1996 | Heath et al. |
| 5,784,615 A | * | 7/1998 | Lipe et al. ................... 709/324 |
| 5,901,312 A | * | 5/1999 | Radko ......................... 709/104 |
| 5,933,632 A | | 8/1999 | Cahill, III |
| 5,941,947 A | * | 8/1999 | Brown et al. ................ 709/225 |
| 6,009,525 A | | 12/1999 | Horstmann |
| 6,086,623 A | * | 7/2000 | Broome et al. ............... 703/26 |
| 6,154,818 A | * | 11/2000 | Christie ....................... 711/163 |
| 6,175,924 B1 | * | 1/2001 | Arnold ........................ 713/189 |
| 6,199,181 B1 | * | 3/2001 | Rechef et al. ................. 714/38 |
| 6,202,145 B1 | * | 3/2001 | Barnes et al. ................ 712/244 |
| 6,308,317 B1 | * | 10/2001 | Wilkinson et al. .......... 717/139 |
| 6,351,778 B1 | * | 2/2002 | Orton et al. ................. 709/310 |
| 6,370,606 B1 | * | 4/2002 | Bonola ........................ 710/260 |
| 6,453,353 B1 | * | 9/2002 | Win et al. .................... 709/229 |
| 6,480,818 B1 | * | 11/2002 | Alverson et al. ............. 703/26 |

FOREIGN PATENT DOCUMENTS

| | | | |
|---|---|---|---|
| EP | 0 472 487 A2 | 2/1992 | |
| EP | 472487 A2 | * 2/1992 | ............. G06F/9/46 |
| WO | WO 98/47072 | 10/1998 | |
| WO | WO 9847072 A1 | * 10/1998 | ........... G06F/12/14 |

OTHER PUBLICATIONS

M.R. Zick: "Two Mode Storage Protection Mechanisms. Jul. 1976", IBM Technical Disclosure Bulletin, vol. 19, No. 2, Jul. 1, 1976, pp. 425–428, XP002168726, New York, US, p. 427, last paragraph, p. 428, last paragraph; figures 4–7.

* cited by examiner

Primary Examiner—Meng-Al T. An
Assistant Examiner—Lilian Vo
(74) Attorney, Agent, or Firm—Schwabe, Williamson & Wyatt, P.C.

(57) ABSTRACT

In a data/information processing system, a nested privilege protection is employed to protect the system when executing instructions. A first privilege protection having at least two privilege levels is enforced. Additionally, a second privilege protection having at least two sub-privilege levels is further enforced for at least one privilege level of the first privilege protection to further differentiate the privileges otherwise afforded. In one embodiment, core system services, programming language runtime support and application programs are afforded the same privilege level of the first privilege protection, and the different types of programs are afforded different sub-privilege levels of the second privilege protection to differentiate the privileges afforded by the first privilege protection. In one embodiment, the differential sub-privilege level protection is further extended to application programs of different sources, making the system particularly suitable for networked applications, such as accessing web servers on the Internet. In one embodiment, the first privilege protection is hardware facilitated, while the second privilege protection is software facilitated.

14 Claims, 4 Drawing Sheets

METHOD AND APPARATUS FOR PROTECTIVELY OPERATING A DATA/INFORMATION PROCESSING DEVICE

BACKGROUND OF THE INVENTION

1. Field of the Invention

The present invention relates to the field of electronic data/information processing. More specifically, the present invention relates to methods and apparatuses for protectively operating data/information processing devices.

2. Background Information

The term "data/information processing devices" as used herein is intended to include all microprocessor based devices and/or systems, operated under the control of an operating system. Examples of these devices/systems include but are not limited to general as well as special purpose computing devices/systems, regardless of form factors, palm sized, laptops, desktops, rack mounted, and the like. Examples of special purpose computing devices include but are not limited to set-top boxes, wireless communication devices, and the like. The term "operating system" as used herein is intended to include all software provided to manage and facilitate application usage of hardware resources, however minimal the control and resource scope may be. Typical resource management functions of an "operating system" include task scheduling, memory management and the like. The term "task" as used herein is intended to include its common meaning of an executing instance of a program (a collection of programming instructions).

Ever since the early days of computing, computer systems have provided privilege protection to protect the system from being brought down by failures of non-essential programs, such as application programs. The IBM 360 systems provided a supervisor mode and a user mode to segregate privileged system programs and unprivileged user programs. The Multics (Multiplexed Information and Computing Service) developed by Massachusetts Institute of Technology, in cooperation with others, employed a 64 ring approach, combining access node and a triple of ring numbers (r1, r2, r3). In U.S. Pat. No. 4,177,510, issued to Appell et al., a hardware facilitated 4 ring approach is disclosed. Today, the Intel Architecture processors are known to provide a 4 ring hardware facilitated protection through the employment of memory segment descriptors and current task privilege level (CPL). However, partly because most of the other microprocessors remain having a two mode protection approach, the Windows® operating system, used in most Intel Architecture compatible processors, merely employ two of the four ring protection provided by the hardware. The virtual memory manager and various virtual device drivers (VxD) are executed in ring 0, while all other programs, including kernel system services and so forth are executed out of ring 3.

The two levels of protection were reasonably adequate in the days when few programs are executed on most computer systems. Moreover, most of the computer systems operate by themselves, with few interactions from the outside world.

Advances in microprocessor, telecommunication and networking technology have dramatically expanded the applications of computing devices, and changed their operating environment. Today, most data/information processing systems are connected to private and/or public networks, such as the Internet, executing programs that are dynamically downloaded from a number of sources. Some sources are trustworthy, and their programs tend to be well behaved, but others are not.

Accordingly, a need exists to improve the protection of data/information processing systems.

SUMMARY OF THE INVENTION

In a data/information processing system, a nested privilege protection is employed to protect the system when executing instructions. A first privilege protection having at least two privilege levels is enforced. Additionally, a second privilege protection having at least two sub-privilege levels is further enforced for at least one privilege level of the first privilege protection to further differentiate the privileges otherwise afforded.

In one embodiment, core system services, programming language runtime support and application programs are afforded the same privilege level of the first privilege protection, and the different types of programs are afforded different sub-privilege levels of the second privilege protection to differentiate the privileges afforded by the first privilege protection. In one embodiment, the differential sub-privilege level protection is further extended to application programs of different sources, such as trusted and untrusted.

In one embodiment, the first privilege protection is hardware facilitated, while the second privilege protection is software facilitated.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using terms such as scripts, applet, end-user interfaces, icons, and so forth, commonly employed by those skilled in the art to convey the substance of their work to others skilled in the art. Parts of the description will be presented in terms of operations performed by a computer system, using terms such as registering, notifying, sending, and so forth. As well understood by those skilled in the art, these quantities and operations take the form of electrical, magnetic, or optical signals capable of being stored, transferred, combined, and otherwise manipulated through mechanical and electrical components of a digital system; and the term digital system include general purpose as well as special purpose data processing machines, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
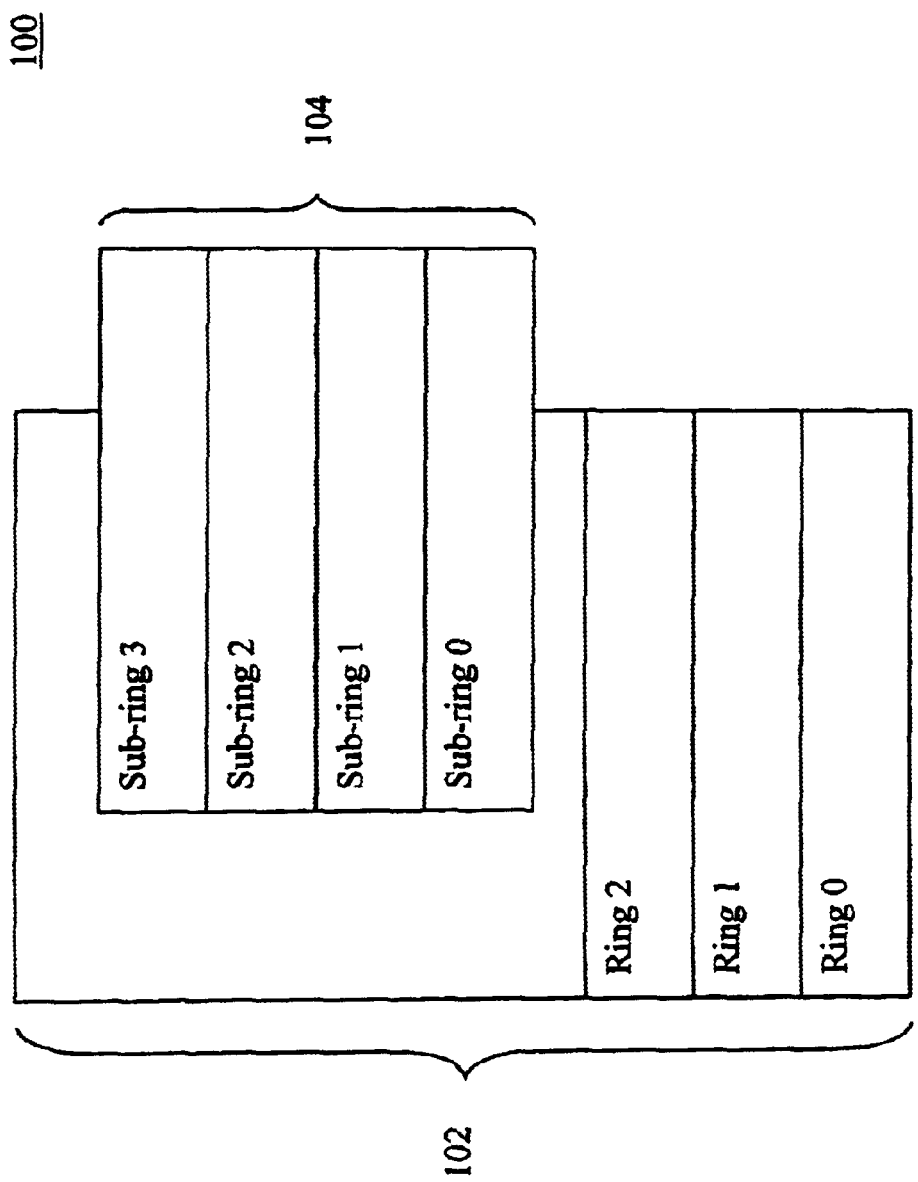
FIG. 1 illustrates an overview of the present invention, in accordance with one embodiment.

Referring now to FIG. 1, wherein an overview of the present invention in accordance with one embodiment is shown. As illustrated, in accordance with the present invention, a nested privilege protection approach is employed to protectively operate a data/information processing system (hereinafter, simply system). Nested privilege protection 100 includes at least two substantially independent privilege protections to protect the system during instruction execution (i.e. from their failures). For the illustrated embodiment, two such privilege protections 102 and 104 are shown. First privilege protection 102 has at least two privilege levels enforced at the system level for executing instructions. For the illustrated embodiment, four privilege levels are shown, ring 0 through ring 3. Second privilege protection 104 also has at least two sub-privilege levels enforced for at least one of the privilege level for executing instructions, to further differentiate the privileges afforded to different executing programs otherwise accorded by first privilege protection 102. For the illustrated embodiment, four sub-privilege levels, sub-ring 0 through sub-ring 3, for ring 3 of first privilege protection 102 are shown. As a result, system protection is advantageously strengthened over the protection otherwise afforded by employing only first privilege protection 102. In particular, when the privilege protection afforded by first privilege protection 102 is not fully taken advantage (as in the case of Window® and Intel Architecture processors), the present invention advantageously enables the protection sacrificed to be recovered.

The term "privilege ring" or "ring" as used herein is intended to include its conventional meaning that a program afforded a more inner privilege ring (or sub-ring) typically has privileges inclusive that of another program afforded a more outer privilege ring (or sub-ring). The details of these privileges (and their further differentiation) are implementation dependent, and non-essential to the understanding of the present invention.

Before further describing the present invention, it should also be noted that while four rings are shown for first privilege protection 102, the present invention may be practiced with first privilege protection 102 enforcing less or more privilege levels. Similarly, while second privilege protection 104 is shown for only one privilege level of first privilege protection 102, and having four sub-privilege level, the present invention may be practiced with second privilege protection 104 being employed for more than one privilege level of first privilege protection 102, and/or having less or more sub-privilege levels. Likewise, additional nested sub-privilege protection may be employed (e.g. for one of the sub-privilege level of second privilege protection 104) to further differentiate the privileges otherwise afforded by first and second privilege protections 102 and 104.

Figure 2:
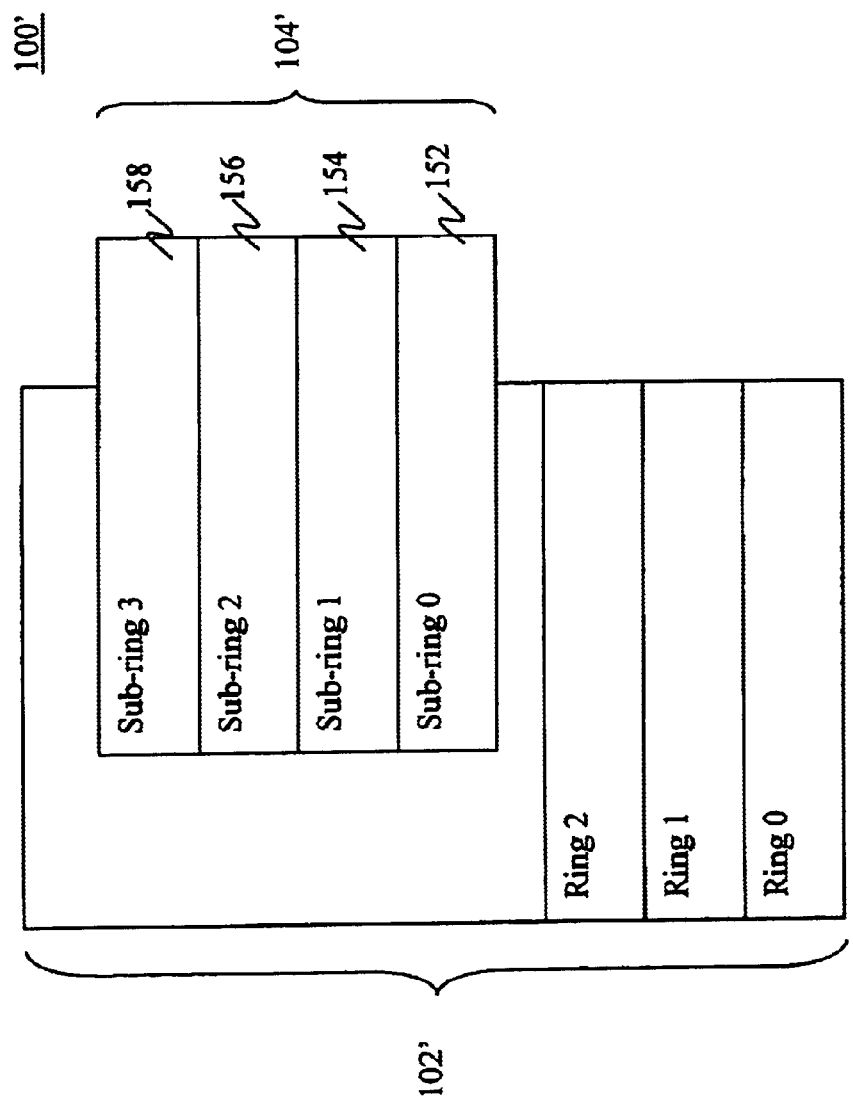
FIG. 2 illustrates a method of the present invention in accordance with one embodiment.

Referring now to FIG. 2, wherein an example application of the present invention in accordance with one embodiment is shown. For the illustrated embodiment, second privilege protection 104' having four sub-privilege levels, sub-ring 0 through sub-ring 3, is employed to provide further protection to a system by affording additional differentials to the privileges of core system services 152, programming language runtime supports 154 for different programming languages, application programs of a first kind 156, and application programs of a second kind 158, which are otherwise accorded the same privileges under first privilege protection 102' (i.e. being assigned the same privilege ring, e.g. ring 3). More specifically, core system services 152 are afforded the full privileges otherwise accorded, programming language runtime supports 154 are afforded a first smaller subset of these otherwise accorded privileges, application programs of the first kind 156 are afforded a second yet even smaller subset, and finally, application programs of the second kind 158 are afforded a third yet even smaller (e.g. minimal) subset. The privilege boundaries of these subsets are application dependent. Thus, as alluded to earlier, the illustrated embodiment enables additional protection to be afforded, or at a minimum, recovering protections of first privilege protection 102' otherwise sacrificed.

What constitutes application programs of a first kind 156 versus a second kind 158 is also application dependent. In one implementation, program codes, such as scripts and applets, dynamically downloaded by a browser (e.g. from various Web servers through the Internet) are considered as application programs of the second kind 158, to be afforded the least privileged sub-privilege ring. Thus, it can be seen a system incorporated with the present invention is particularly suitable for networked systems where the systems are exposed to programs from a variety of uncertain sources.

In alternate embodiments, other differentiation of the otherwise afforded privileges may be made instead. For example, instead of according all scripts and applets dynamically downloaded by the browser the least privileged sub-privilege ring, scripts and applets dynamically downloaded from a trustworthy site (such as, an intranet web site of a corporation) may nevertheless be considered applications of the first kind and accorded privileges of the next more privileged privilege ring. Similarly, instead of according all programming language runtime supports 154 the same sub-privilege ring, runtime supports for some programming languages may be afforded a more privileged ring, while runtime supports for other programming languages may be afforded a lesser privilege ring.

Figure 3:
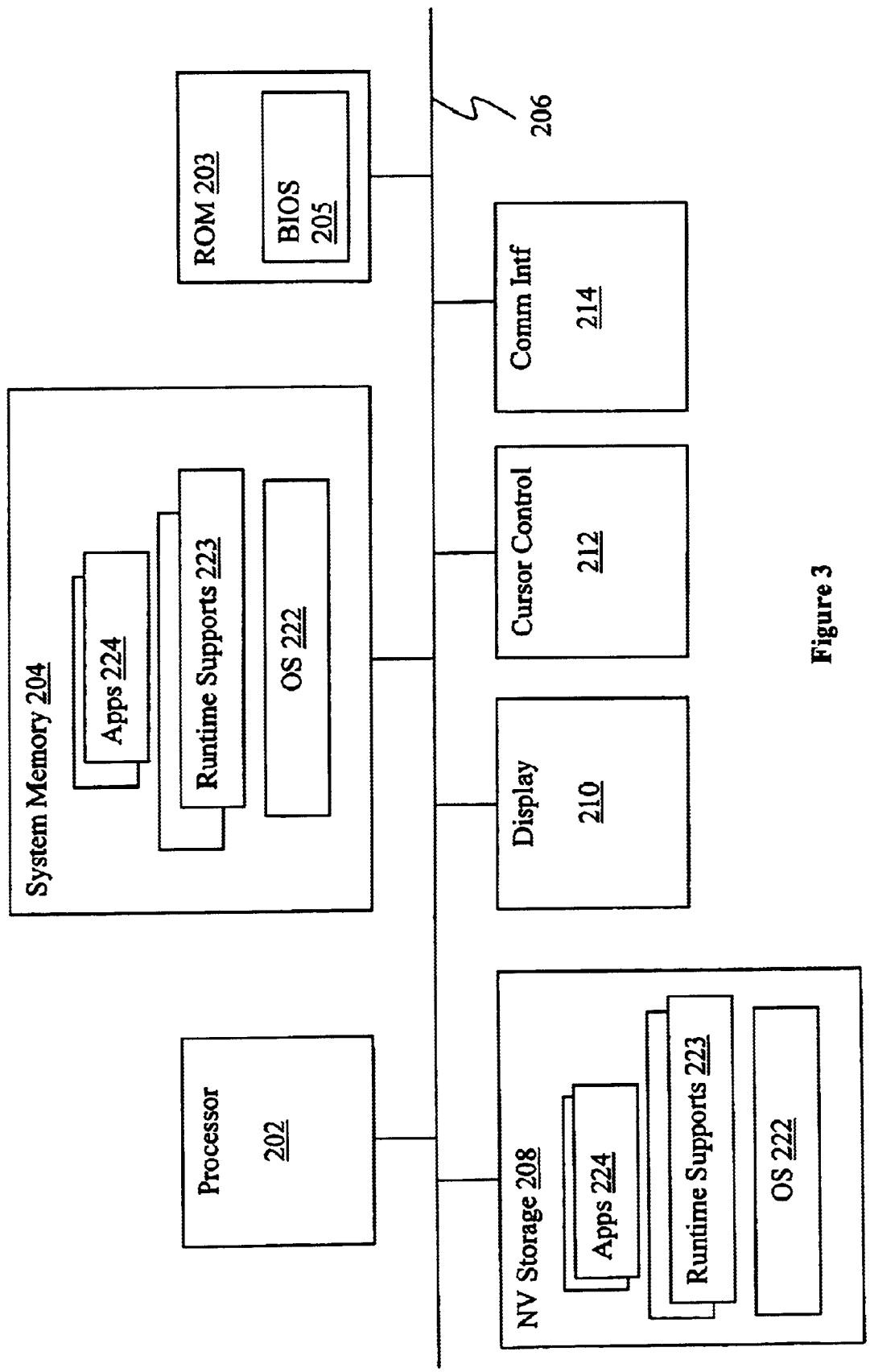
FIG. 3 illustrates an example data/information processing system suitable for practicing the present invention.

Referring now to FIG. 3, wherein a block diagram illustrating an example system incorporated with the teachings of the present invention is shown. As shown, example system 200 includes processor 202, ROM 203, and system memory 204 coupled to each other via "bus" 206. Coupled also to "bus" 206 are non-volatile mass storage 208, display device 210, cursor control device 212 and communication interface 214. ROM 203 includes a basic input/output system (BIOS) 205. During operation, memory 204 includes working copies of applications 224, programming language runtime supports 223, and working copies of operating system 222. In one embodiment, either applications 224 or operating system 222 includes a browser (not shown) for accessing local as well as remote information, such as web pages from various web servers available on an intranet or the Internet.

Processor 202 is equipped with hardware support to implement first privilege protection 102. Operating system 222 is incorporated with the teachings of the present invention, implementing second privilege protection 104, to be described in more detail below. In other words, for the illustrated embodiment, first privilege protection 102 is hardware facilitated, while second privilege protection 104 is software facilitated. In alternate embodiments, both protections may be hardware or software facilitated.

Examples of processors 202 include but are not limited to processors of the Pentium® family available from Intel Corporation of Santa Clara, Calif., and processors of the PowerPC® family available from IBM of Armonk, N.Y. Except for the teachings of the present invention incorporated, operating system is otherwise intended to represent a wide range of operating systems known in the art. Examples of operating system 222 that may be enhanced include but are not limited to the Window® operating system available from Microsoft Corp., of Redmond, Wash., and the Linux operating system, available e.g. from Red Hat Inc. of Durham, N.C.

Similarly, each of the other enumerated elements is intended to represent a wide range of the respective devices/elements known in the art. For example, ROM 203 may be EEPROM, Flash and the like, and memory 204 may be SDRAM, DRAM and the like, from semiconductor manufacturers such as Micron Technology of Boise, Idaho. Bus 206 may be a single bus or a multiple bus implementation. In other words, bus 206 may include multiple buses of identical or different kinds properly bridged, such as Local Bus, VESA, ISA, EISA, PCI and the like. Mass storage 208 may be disk drives or CDROMs from manufacturers such as Seagate Technology of Santa Cruz of Calif., and the like. Typically, mass storage 208 includes the permanent copy of operating system 222, runtime support 223, and some applications 224. The permanent copy may be installed in the factory, or in the field. For field installation, the permanent copy may be distributed using article of manufactures with recordable medium such as diskettes, CDROM, DVD and the like, or downloaded from a distribution server through a data network (such as the Internet). The distribution server may be a server of the OEM, i.e. the software developer. Display device 210 may be monitors of any types from manufacturers such as Viewsonic of Walnut, Calif. Cursor control 212 may be a mouse, a track ball and the like, from manufacturers such as Logictech of Milpitas, Calif. Communication interface 214 may be a modem interface, an ISDN adapter, a DSL interface, an Ethernet or Token ring network interface and the like, from manufacturers such as 3COM of San Jose, Calif.

Before further describing the enhancements made to operating system 222, it should be noted the present invention may also be practiced without some of the enumerated elements, e.g. mass storage 208, or with additional elements, such as graphics accelerators, audio and video add-on cards, and so forth.

Figure 4:
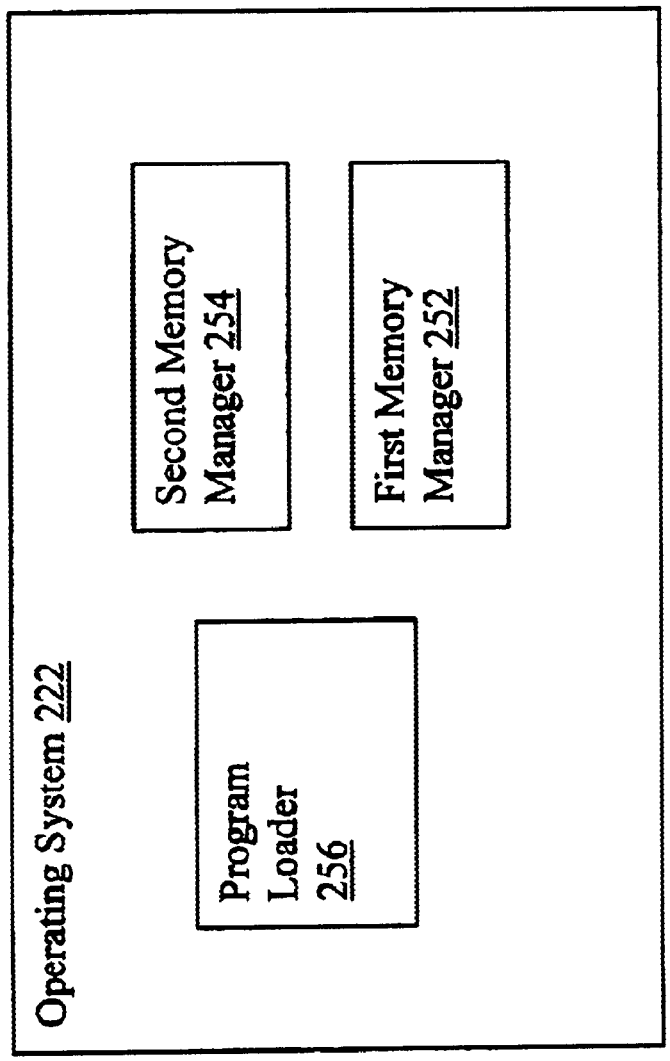
FIG. 4 illustrates the relevant enhancement to the operating system of FIG. 3.

Referring now to FIG. 4, a block diagram illustrating the enhancements made to operating system 222 in accordance with one embodiment is shown. For ease of understanding, only the elements of operating system 222 relevant to the understanding of the present invention are shown. As illustrated, for the embodiment, operating system 222 includes first and second memory mangers 252 and 254, and program loader 256. In one embodiment, program loader 256 is part of core system services 152. First memory manager 252 by design accords itself a first higher privilege level of first privilege protection 102 (e.g. ring 0) facilitated by processor 202, and core system services 152, runtime supports 154 and application programs 156–158 a second lower privilege level of first privilege protection 102 (e.g. ring 3) facilitated by processor 202. In one embodiment, first memory manager 252 accords the privileges by setting a current task privilege level (CPL) when a program of the various types 152–158 is invoked for execution. As alluded to earlier, the privilege is enforced by processor 202 in accordance with the CPL. First memory manager 252 is known in the art, thus will not be further described. For additional information on memory descriptors and CPL, see e.g. product literatures for Intel Architecture processors.

Program loader 256 is enhanced to modify each program invoked, including in particular, a memory allocation request service program (not shown) of core system services 152, to afford second memory manager 254 the opportunity to enforce second privilege protection 104. In one embodiment, the modifications include modifying the memory allocation request service program to trap all memory allocation requests from executing tasks to second memory manager 254 for processing. For the embodiment, the modifications further include modifying each program being invoked for execution such that all memory references will be rerouted to second memory manager 254 for processing. These modifications include modifying all Load and Store instructions with indirect Load and Stores where the load and store addresses are to be obtained from an address table (not shown) under the control of second memory manager 254, including insertion of additional instructions where necessary. For example, in the case of computing A=B+C and then Load A (A being an address), the modifications include inserting a store to store address A into the address table and modifying the Load instruction to Load @ptr (where ptr points to the offset in the address table where address A is stored). These and other ancillary modifications are similar to the techniques employed by compilers in handling register allocations. They are well within the abilities of those ordinarily skilled in the art, accordingly will not be each individually described.

Second memory manager 254 is provided to facilitate and administer second privilege protection 104. By virtue of modification to the memory allocation request service program, second memory manager 254 is by design in charge of all memory allocation for programs to be executed with the second lower privilege level of first privilege protection 102. In one embodiment, where second memory manager 254 accords four sub-privilege levels, second memory manager 254 first obtains a memory pool from first memory manager 252, and services memory requests from core system services 152 by allocating memory locations from a first sub-pool having first n common lower order bits, memory requests from runtime supports 154 by allocating memory locations from a second sub-pool having second n common lower order bits, memory requests from application programs 156 by allocating memory manager 254 locations from a third sub-pool having third n common lower order bits, and memory requests from runtime supports 158 by allocating memory locations from a fourth sub-pool having fourth n common lower order bits. For example, from a 1MB memory pool obtained from first memory manager 252, second memory manager 254 services memory requests from core system services 152 by allocating memory locations from a first 256 K sub-pool constituted with the lowest 1 K locations of each 4 K page, memory requests from runtime supports 154 by allocating memory locations from a second 256 K sub-pool constituted with the second lowest 1 K locations of each 4 K page, and so forth. As a result, the various programs accorded the same privilege level protection of the first privilege protection, but different sub-privilege levels are separated from each other.

Similarly, by virtue of modifications to re-route all memory references of programs accorded the second lower privilege level of first privilege protection 102, second memory manager 254 is enabled to examine each memory reference made by these programs, to ensure in substance they are referencing only memory locations that are within their privilege scopes. Note that for the illustrated embodiment, it is not necessary for second memory manager 254 to fully resolve that a memory reference is definitively within the referencing program's privilege scope. It is suffice for second memory manager 254 to ensure that if the memory reference is referencing the memory pool managed by second memory manager 254, the reference is within the scope of the sub-privilege level, as improper reference to other memory locations not managed by second memory manager 254 will be protected by first privilege protection 102.

Thus, a method and an apparatus for protectively operating a data/information processing system has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:

one or more memory modules;

a processor coupled to the one or more memory modules to execute programming instructions using said memory module(s), with the processor being equipped to provide a hardware facilitated privilege protection for programming instructions being executed using said memory modules, with at least two privilege levels;

a plurality of programming instructions including a first and a second subset of said programming instructions implementing a first and a second memory manager to manage usage of said memory, with the first memory manager managing the hardware facilitated privilege level to be afforded by the processor for different subsets of said programming instructions to be executed, and the second memory manager managing and further facilitating a software facilitated privilege protection for some of the different subsets of said programming instructions to be executed for at least one of said hardware facilitated privilege levels, the software facilitated privilege protection having also at least two sub-privilege levels; and wherein the programming instructions further comprises a third subset implementing a program loader equipped to fix up each subset of said programming instructions it loads for execution by the processor to afford the second memory manager the opportunity to administer the software facilitated privilege protection.

2. The apparatus of claim 1, wherein the first memory manager is equipped to cause the processor to afford itself a first hardware facilitated privilege level, and the second memory manger a second hardware facilitated privilege level having less or equal privileges than the first hardware facilitated privilege level.

3. The apparatus of claim 1, wherein the second memory manger is equipped to afford itself a first software facilitated sub-privilege level having more privileges than all other software facilitated sub-privilege levels.

4. The apparatus of claim 1, wherein the first memory manager is equipped to further cause the processor to afford the same hardware facilitated privilege level to a third subset of programming instructions for providing core system services, and to a fourth subset of programming instructions for providing programming language runtime support for programming instructions of a plurality of programming languages, and the second memory manger is equipped to afford a first software facilitated sub-privilege level to the core system services providing third subset of said programming instructions, and a second software facilitated sub-privilege level to the programming language runtime support providing fourth subset of said programming instructions, the second software facilitated sub-privilege level having less or equal privileges than the first software facilitated sub-privilege level.

5. The apparatus of claim 1, wherein the first memory manager is further equipped to cause the processor to afford the same hardware facilitated privilege level to a third subset of programming instructions for providing programming language runtime support for programming instructions of a plurality of programming languages, and to a fourth subset of said programming instructions implementing application functions, and the second memory manger is equipped to afford a first software facilitated sub-privilege level to the programming language runtime support providing third subset of programming instructions, and a second software facilitated sub-privilege level to the application functions implementing fourth subset of said programming instructions, the second software facilitated sub-privilege level having less or equal privileges than the first software facilitated sub-privilege level.

6. The apparatus of claim 1, wherein the first memory manager is further equipped to cause the processor to afford the same hardware facilitated privilege level to a third and a fourth subset of programming instructions for providing programming language runtime support for programming instructions of a first and a second programming language, and the second memory manger is equipped to afford a first and a second software facilitated sub-privilege level to the first and second programming language runtime support providing third and fourth subset of said programming instructions respectively, the second software facilitated sub-privilege level having less or equal privileges than the first software facilitated sub-privilege level.

7. The apparatus of claim 6, wherein the first programming language runtime support providing third subset of said programming instructions are from a first source, and the second programming language runtime support providing fourth subset of said programming instructions are from a second source.

8. The apparatus of claim 1, wherein the first memory manager is further equipped to cause the processor to afford the same hardware facilitated privilege level to a third and a fourth subset of said programming instructions implementing a plurality of applications, and the second memory manger is equipped to afford a first and a second software facilitated sub-privilege level to the third and fourth application implementing subset of said programming instructions respectively, the second software facilitated sub-privilege level having less or equal privileges than the first software facilitated sub-privilege level.

9. The apparatus of claim 8, wherein the third application implementing subset of said programming instructions are from a trusted source, and the second application implementing subset of said programming instructions are from an untrusted source.

10. The apparatus of claim 8, wherein the third application implementing subset of said programming instructions are web pages downloaded from a first web server, and the second application implementing fourth subset of said programming instructions are web pages downloaded from a second web server.

11. The apparatus of claim 1, wherein the program loader is equipped to fix up a memory allocation request service program to trap each memory allocation request by a subset of said programming instructions to the second memory manager.

12. The apparatus of claim 11, wherein the second memory manager is equipped to allocate memory in response to memory requests from various subsets of said programming instruction to be afforded the same software facilitated sub-privilege level from a sub-pool of memory locations with the same n lower order bits of a memory pool, where n is an integer.

13. The apparatus of claim 1, wherein the program loader is equipped to fix up each subset of said programming instructions it loads for execution by the processor, to re-route each memory reference by the subset of said programming instruction through the second memory manager.

14. The apparatus of claim 13, wherein the second memory manager is equipped to validate all memory references made by different subsets of said programming instructions to be afforded the same software facilitated sub-privilege level to reference only an eligible sub-pool of memory locations with the same n lower order bits of a memory pool, where n is an integer.

* * * * *